INVENTOR
H. A. HENNING
BY J. P. Kearns, Jr.
ATTORNEY

Aug. 13, 1963 H. A. HENNING 3,100,890

DATA TRANSMISSION

Filed Oct. 11, 1960

4 Sheets-Sheet 2

INVENTOR
H. A. HENNING

BY J. P. Kearns, Jr.

ATTORNEY

Aug. 13, 1963 H. A. HENNING 3,100,890

DATA TRANSMISSION

Filed Oct. 11, 1960 4 Sheets-Sheet 3

INVENTOR
H. A. HENNING
BY J. P. Kearns, Jr.
ATTORNEY

INVENTOR
H. A. HENNING
BY J. P. Kearns, Jr.
ATTORNEY

United States Patent Office 3,100,890
Patented Aug. 13, 1963

3,100,890

DATA TRANSMISSION

Harley A. Henning, Short Hills, N.J., assignor to Bell Telephone Laboratories, Incorporated, New York, N.Y., a corporation of New York Filed Oct. 11, 1960, Ser. No. 61,862
10 Claims. (Cl. 340—345)

This invention relates in general to data communications systems and more specifically to phase-shift transmitters for such systems.

In recent years considerable interest has been aroused in the possibilities of putting the considerable investment in switched voice telephone circuits to use for the transmission of digital data between telephone subscribers. Such services in the past have generally been provided on private line facilities, the transmission characteristics of which can be adjusted for optimum data transmission requirements. The increased use of computers and automatic data processing systems has so augmented the demand for data services that it is rapidly becoming impracticable to furnish sufficient private wire facilities. Besides, the customer is often unwilling to pay the increased cost of private line circuits.

The switched telephone network has been built up over the years primarily to meet the requirements of voice communications. The characteristics engineered into the system, while usable for data transmission, are not optimal for this service. The bandwidth of a voice channel is narrower than might be desired, and is not generally usable below about 300 cycles per second. This characteristic limits transmission speeds and virtually precludes the direct transmission of data which has a direct-current component. The circuit net loss is such as to reduce the effective signal-to-noise ratio and thereby to increase the error rate in digital messages. There is the further problem of impulse noise largely generated by the opening and closing of switching contacts in a telephone central office. Impulse noise, while inconsequential in its effect on voice communication, tends to obliterate data bits in some instances and to introduce spurious ones in others.

Accordingly, attention has been directed to the use of frequency and phase modulation methods to translate the on-off data bits to carrier frequencies centered in the voice band. Phase modulation techniques have been found particularly effective in overcoming the noise problems encountered in using voice telephone circuits for transmitting data.

Most data transmission systems are synchronous, i.e., a common timing source or clock links transmitter and receiver in order to insure accurate interpretation of the transmitted message. Data messages are generally encoded into binary digits, or bits, and each digit or bit is assigned to an equal length time interval for transmission purposes. The problem at the receiver is to recognize the occurrence of these time intervals and to sample the interval at the correct instant to determine the nature of the bit transmitted therein. It has been found in a phase modulation system that two successive bits can be transmitted as a single shift in phase. Since there are only four possible bit pair combinations, only four discrete phases are needed to transmit all possible digital messages. Furthermore, these discrete phases need not be absolute phases, but may be relative phases. Each successive phase shift need only be made with respect to the previous phase transmitted.

Where a relative phase shift system is adopted, a stored reference receiving system is generally employed. In such a receiving system each received phase is stored for one bit interval and compared with the next succeeding phase to determine what phase shift has occurred.

A stored reference system obviates having an accurately phased local carrier generator at the receiver.

Although the four-phase data transmission system outlined above is generally satisfactory in the case of random signals, in the case of certain repeated signals of the same coding no phase shifts are generated and the transmitted signal degenerates into pure carrier. Synchronism between transmitter and receiver is lost. It has, therefore, been suggested to superimpose on the phase shifts resulting from the change in coding from interval to interval in the four-phase system an arbitrary fixed phase shift whether the coding changes or not. This fixed phase shift may conveniently be 45 degrees. The four-phase system is then transformed into an eight-phase system and a minimum phase advance or retardation of 45 degrees in phase of the carrier frequency is secured even for repeated signals. Synchronism between transmitter and receiver is preserved at all times and no additional channel space is required to transmit timing information.

Although eight-phase data transmission systems are known to the prior art, the means for realizing a practical system have been unnecessarily complex and cumbersome. It is, therefore, a general object of this invention to simplify the realization of an eight-phase data transmission system. It is a further object of this invention to generate the phase-shifted carrier wave solely by digital means. It is an alternative object to determine the necessary carrier phase by digital means but to control thereby the phase of a sinusoidal carrier wave.

According to this invention a serial binary data signal after conversion into two-bit parallel or dibit form is encoded as one of eight relative phases on a single frequency carrier wave. A register and control circuit, here called a vector keyer from its function of determining the direction and amount of rotation of the carrier frequency phase vector, stores information on the phase of the carrier frequency vector then being transmitted, computes the phase rotation next to be imparted to the carrier frequency according to the dibit combination to be transmitted and provides control signals to a carrier modulator. Taking advantage of the facts that all eight phase vectors can be represented by sums of 45, 90 and 180 degrees taken one, two and three at a time and that these three phases are in the ratio of 1:2:4, the eight possible phases are stored and manipulated in the vector keyer as a three-digit binary number. The most significant digit represents 180 degrees; the next most significant, 90 degrees; and the least significant, 45 degrees. The vector keyer is therefore a three-stage counting register with its basic counting rate controlled by a clock generator. For each clock pulse the keyer samples the dibit signal combination and adds or subtracts an appropriate amount according to a predetermined code such that a minimum count of one (equivalent to a phase change of 45 degrees) is added to or subtracted from the contents of its register. This insures that a phase shift is imparted to the carrier frequency in each dibit interval. The outputs of the three stages of the vector keyer serve as control signals applied to a carrier wave modulator.

According to one embodiment of this invention, the digital outputs of the vector keyer are used to key synchronized square waves having frequencies of four, two and one times the carrier frequency in a modulator circuit to an output bistable circuit to produce a rectangular wave output having the frequency of the carrier wave and a phase shift which changes in each dibit interval. The synchronized square waves are derived from a stable frequency source eight times the frequency of the carrier wave. A smooth output wave is obtained by passing the output of the bistable circuit through a low-pass filter.

In another embodiment of the invention the several outputs of the vector keyer are applied to separate reversing modulators. In this embodiment a sinusoidal carrier wave generator has its output split into direct and quadrature components. The direct component is modulated with the 180-degree output of the vector keyer to reverse its phase or not. The quadrature component is modulated with the 90-degree output of the vector keyer to reverse its phase or not. The modulated direct and quadrature components are added together and the resultant is shifted 45 degrees or not according to the 45-degree output of the vector keyer.

The output signals from each of these embodiments are substantially identical and represent the serial data message as relative phases of the single-frequency carrier wave.

An important feature of this invention is that synchronizing information is inherent in the transmitted signal because of the fact that a minimum phase shift is always provided between data combinations. No auxiliary timing sources are, therefore, required at the receiving end of a transmission line on which these signals are impressed.

A more complete understanding and appreciation of this invention can be obtained from the following detailed description together with the drawings in which.

Figure 1:
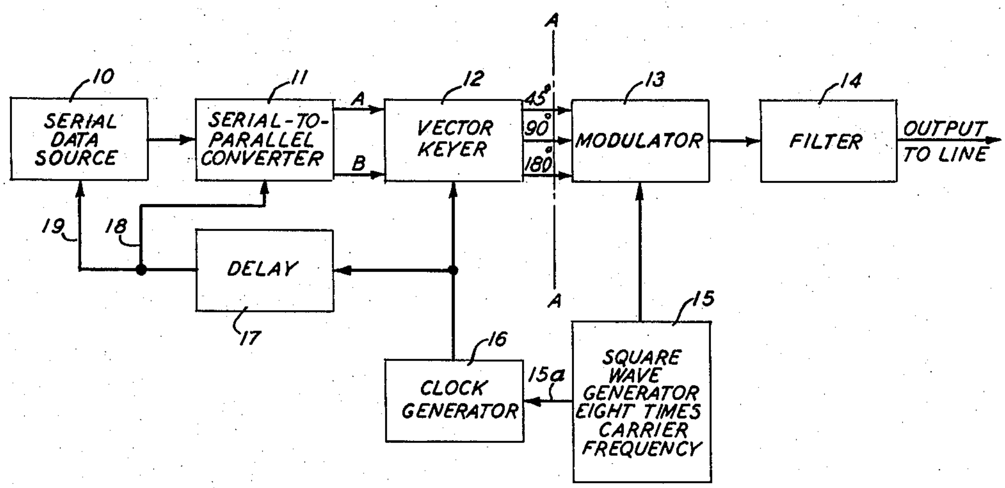
FIG. 1 is a block diagram of an all-digital phase-pulse modulator according to this invention.

In transmitting a binary signal, two signal conditions are required, namely: the presence of the specific signal and its absence. The presence of the specific signal is conventionally designated as "1" and its absence as "0." The "1" signal may be represented as the presence of a voltage and the "0" by its absence. As an alternative the "1" may be represented by ground and its absence by a negative voltage. This latter convention is assumed in the following description.

In a phase-pulse system, that is, a system in which pulses are encoded as shifts in phase of a single-frequency carrier wave, the binary digits or bits may be encoded as absolute phases such as 0 and 180 degrees or as relative phase shifts where each preceding signal serves as a reference for the succeeding signal. In using the relative phase shift system, it has been found that more information can be transmitted in a given time interval by adopting a quadrature phase shift system. By this means serial data can be encoded into signal pairs, which may be denominated dibits for brevity. In the alternative two otherwise independent channels of digital information can be paired bit by bit and transmitted on a single channel. In the serial case transmission occurs at half the serial rate. In the dual channel case transmission is at the source rate. There are clearly four paired signal codes, namely: 00, 01, 10 and 11. These codes may be assigned any particular phase shift of a quadrature set. In the following description the several codes are assigned phase shifts of 45 degrees advance, 135 degrees advance, 135 degrees retard, and 45 degrees retard corresponding to the order of the codes listed above. Since these phase shifts are all multiples of 45 degrees, it is readily seen that a random signal sequence will result in the carrier phase vector occupying any of eight absolute phase positions which are multiples of 45 degrees. Furthermore, each successive code combination will place the phase vector alternately on one of two quadrature phase axis sets. One quadrature phase axis includes the absolute phases 0, 90, 180 and 270 degrees. The other quadrature phase axis includes the absolute phases 45, 135, 225 and 315 degrees. It is, therefore, evident that any repeated signal codes will generate a minimum 45-degree phase shift.

Although the use of the invariant 45-degree phase shift between dibit intervals insures a phase shift between starts of successive dibit intervals, nevertheless smooth transitions may occur with certain signal combinations unless an integral number of quarter cycles of carrier are present in each dibit timing interval. For the purposes of this description the dibit rate is assumed to be 1000 and the carrier frequency, 1500 cycles per second, thus yielding one and one-half cycles of carrier for each dibit. This carrier frequency is near the center of the voice band, and is readily transmitted through the switched telephone network. It is to be understood that other data rates and carrier frequencies may be used, if desired.

Referring now to FIG. 1, one sees an all-digital phase modulation system for the transmission of binary digital data in two-bit parallel form. The system comprises to the left of dash-dot vertical line A—A a serial data source 10, a serial-to-parallel converter 11, a vector keyer 12, a clock generator 16 and a delay network 17. To the right of the line A—A the system of one embodiment further comprises a modulator 13, a square-wave generator 15, and a low-pass filter 14.

The clock generator 16 regulates the system and may be of any convenient form but preferably providing a square-wave output at the dibit rate of 1000 cycles per second. The square-wave generator 15 may be of similar form, but is preferably crystal-controlled to provide a 12-kilocycle per second output square wave. For precision control of the clock generator a locking connection indicated by line 15*a* may be provided between the carrier generator 15 and the clock generator 16 in any well-known manner. The clock generator provides a direct output to the vector keyer 12 and a delayed output through delay network 17 to data source 10 and converter 11 by way of lines 19 and 18, respectively. The delay need only be a small fraction, say 10 percent, of the dibit interval in order to insure that the converter outputs are present when the vector keyer samples the output thereof.

The serial data source may be a tape or card reader or similar device ready to furnish data at twice the dibit rate. The data source is signaled over line 19 when the system is prepared to accept data and this signal controls the rate of removal of data from the source.

The output of the data source is converted from serial form at 2000 bits per second to parallel form at 1000 bits per second in converter 11. The converter may be of any conventional form such as a two-stage shift register. It furnishes outputs on lines A and B corresponding to the first and second data bit of each dibit pair. The input between dibit intervals on line 18 from delay network 17 resets the converter.

Outputs A and B are sampled at the appropriate time by vector keyer 12 under the timing control of the output of clock generator 16. Keyer 12 is a novel three-stage binary counting register as more fully described below. Its countdown rate is controlled by the output of clock 16. The countdown is modified arithmetically in accordance with the signal combination found on leads A and B to produce three simultaneous outputs on leads marked 45, 90 and 180 degrees. The sum of these outputs at any time determines the phase of the carrier wave in modulator 13.

Carrier generator 15 may be any conventional sinusoidal crystal-controlled oscillator operating at eight times the carrier frequency coupled with a squaring circuit. Its output is applied to modulator 13.

Modulator 13 provides means for counting down from the eight times carrier frequency rectangular wave from generator 15 to square waves at four, two and one times the carrier frequency. The 45-, 90- and 180-degree outputs of vector keyer 12 gate the four, two and one times carrier frequency square waves, respectively, to set and reset inputs of an output bistable circuit in such a way that properly phased rectangular waves are produced at the carrier frequency as an output signal. The four times carrier frequency square wave provides eight transitions corresponding to 45-degree increments at the carrier frequency. The two times carrier frequency square wave similarly provides four transitions corresponding to 90-degree increments at the carrier frequency. Finally the carrier frequency square wave provides two transitions corresponding to 180-degree positions of the carrier frequency. Thus, alternate gating of the carrier frequency square wave to the output bistable circuit produces an output rectangular wave at the carrier frequency. Simultaneous gating of the proper transitions of the four and two times carrier frequency square waves to the bistable output circuit determines the proper phase. The manner in which the gating is controlled by the vector keyer is more fully described below.

Filter 14 is a low-pass filter of any conventional type with a cutoff frequency above the desired carrier frequency and below the third harmonic thereof. A convenient cutoff point may be at 3000 cycles per second, the upper limit of the frequency pass-band of most voice circuits. This cutoff frequency will aid in producing a proper match to the transmission line and will result in an output of sine form.

The system of FIG. 1 is explained in more detail in connection with the description of FIGS. 3 through 6.

Figure 2:
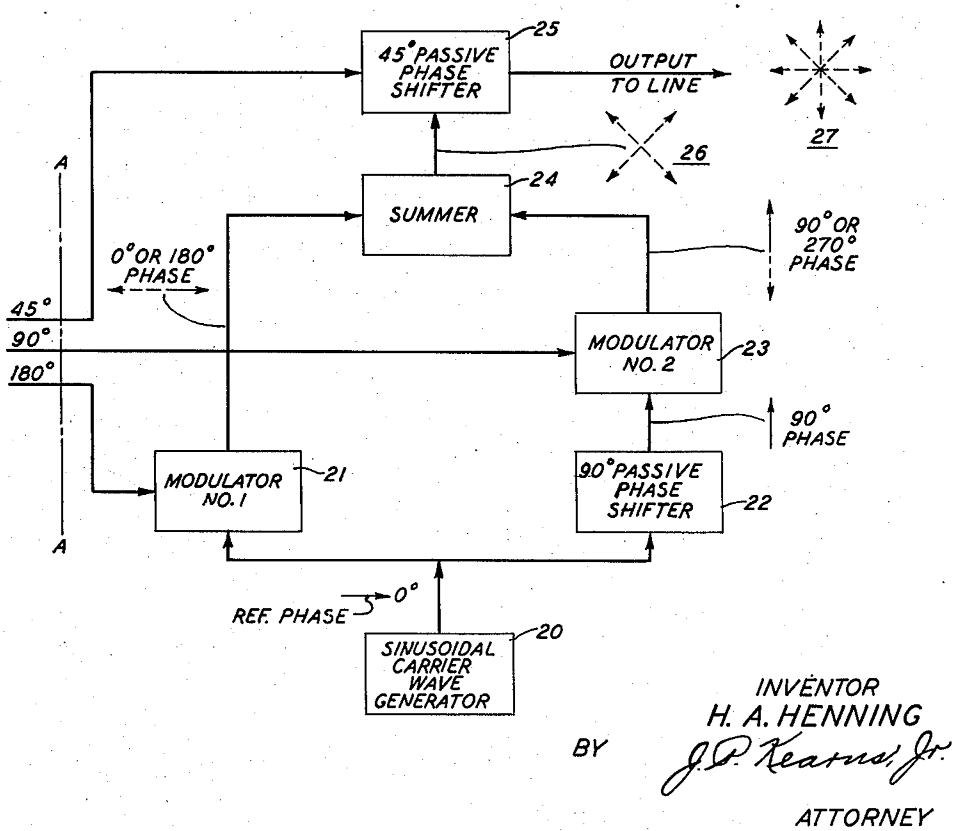
FIG. 2 is a block diagram of another embodiment of this invention which employs a sinusoidal carrier wave generator.

FIG. 2 is diagrammatic of another embodiment of this invention in which the carrier wave is sinusoidal throughout. A complete transmitter according to FIG. 2 includes all apparatus shown in FIG. 1 to the left of the vertical dot-dash line A—A. The 45-, 90- ond 180-degree outputs of the vector keyer 12 in FIG. 1 are applied to separate modulators in FIG. 2.

The new apparatus in the embodiment of FIG. 2 includes a sinusoidal carrier wave generator 20, which may be any conventional type. A crystal-controlled oscillator is suggested. The frequency is assumed to be 1500 cycles per second. The output of generator 20 is split into two paths. One path to the left in FIG. 2 is connected directly to phase-reversing modulator 21. The other path includes a 90-degree passive phase-shifting circuit 22 of any well-known kind. The output of the phase-shifter 22 is applied to a second modulator 23, which is identical to modulator 21. The outputs of both modulators are combined in a summer, or adding, circuit 24. From the summer the combined output is applied through a passive 45-degree phase-shifter to the output line.

Modulator 21 is controlled or reversed by the signal on the 180-degree lead from the vector keyer 12 in FIG. 1. The input to this modulator is represented on the figure as the reference phase. The output may be either the reference phase or its opposite 180-degree phase. Modulator 21 is, therefore, equivalent in operation to a double-pole double-throw switch and may include an input and output transformer interconnected by a rectifier bridge biased by the 180-degree signal.

Modulator 23 is identical to modulator 21, except that it receives a 90-degree carrier phase from the phase-shifter 22 and is controlled by the 90-degree output of vector keyer 12 in FIG. 1. Its output may be either the 90- or 270-degree phase indicated.

The outputs of modulators 21 and 23 are combined in summer 24 to produce a resultant phase that may be any one of the quadrature phases indicated on vector diagram 26, namely: 45, 135, 225, or 315 degrees according to the control signals on leads 90 and 180 degrees from the vector keyer 12 in FIG. 1. The summer may be any common combining circuit having separate inputs and a common output, such as two triodes having a common plate circuit and separate grid circuits.

The summer output is further adjusted by 45 degrees or not in phase-shifter 25 according to whether a signal is present on or absent from the 45-degree lead from the vector keyer 12 in FIG. 1. The signal from the keyer may be arranged to insert or remove the phase-shifter from the outgoing path to the line. The phase-shifter output is the line signal and during any dibit interval may be any one of the eight phases indicated on vector diagram 27.

The vector keyer of FIG. 1 is seen, therefore, to be adaptable to producing a phase-shifted carrier signal solely by digital means as in FIG. 1 or by means of reversing-type modulators as in FIG. 2.

Figure 3:
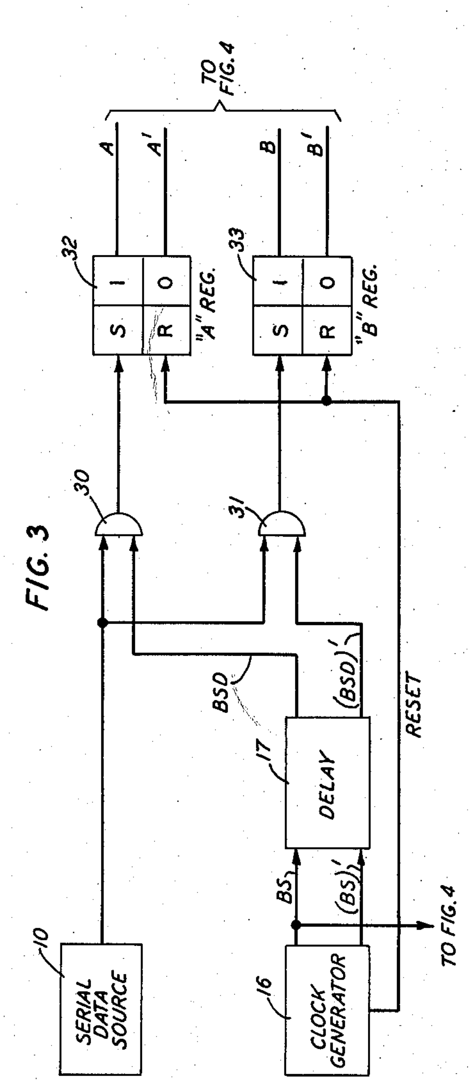
FIG. 3 is a block diagram showing in more detail a serial-to-parallel converter useful in the practice of this invention.
Figure 4:
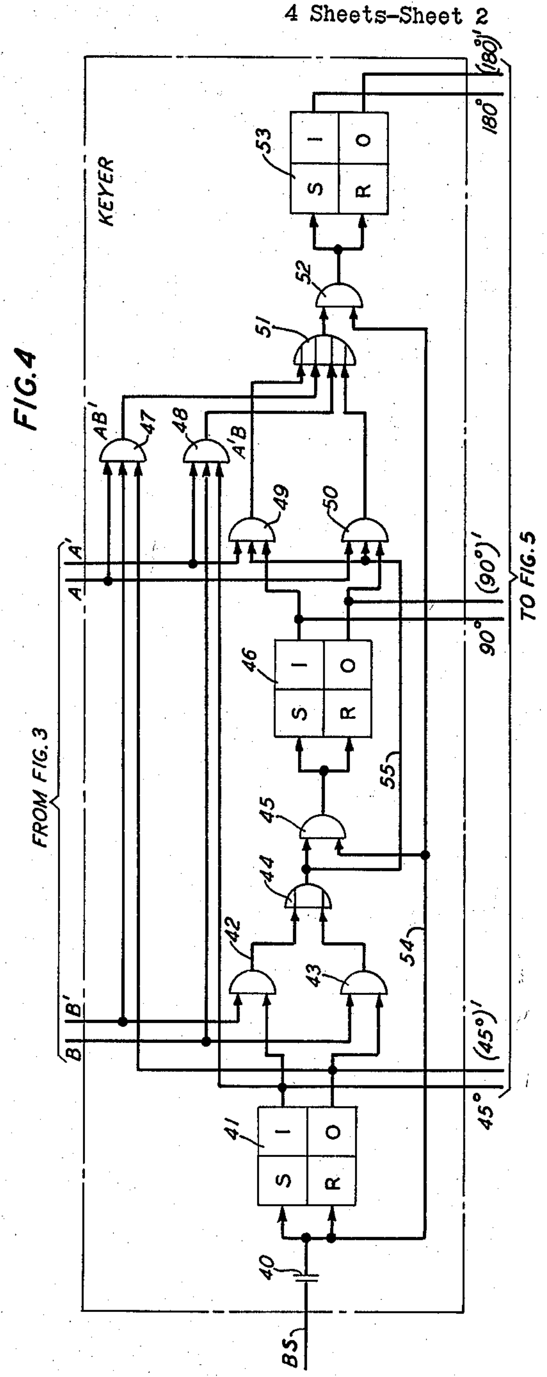
FIG. 4 is a detailed block diagram of a vector keyer useful in the practice of this invention.
Figure 5:
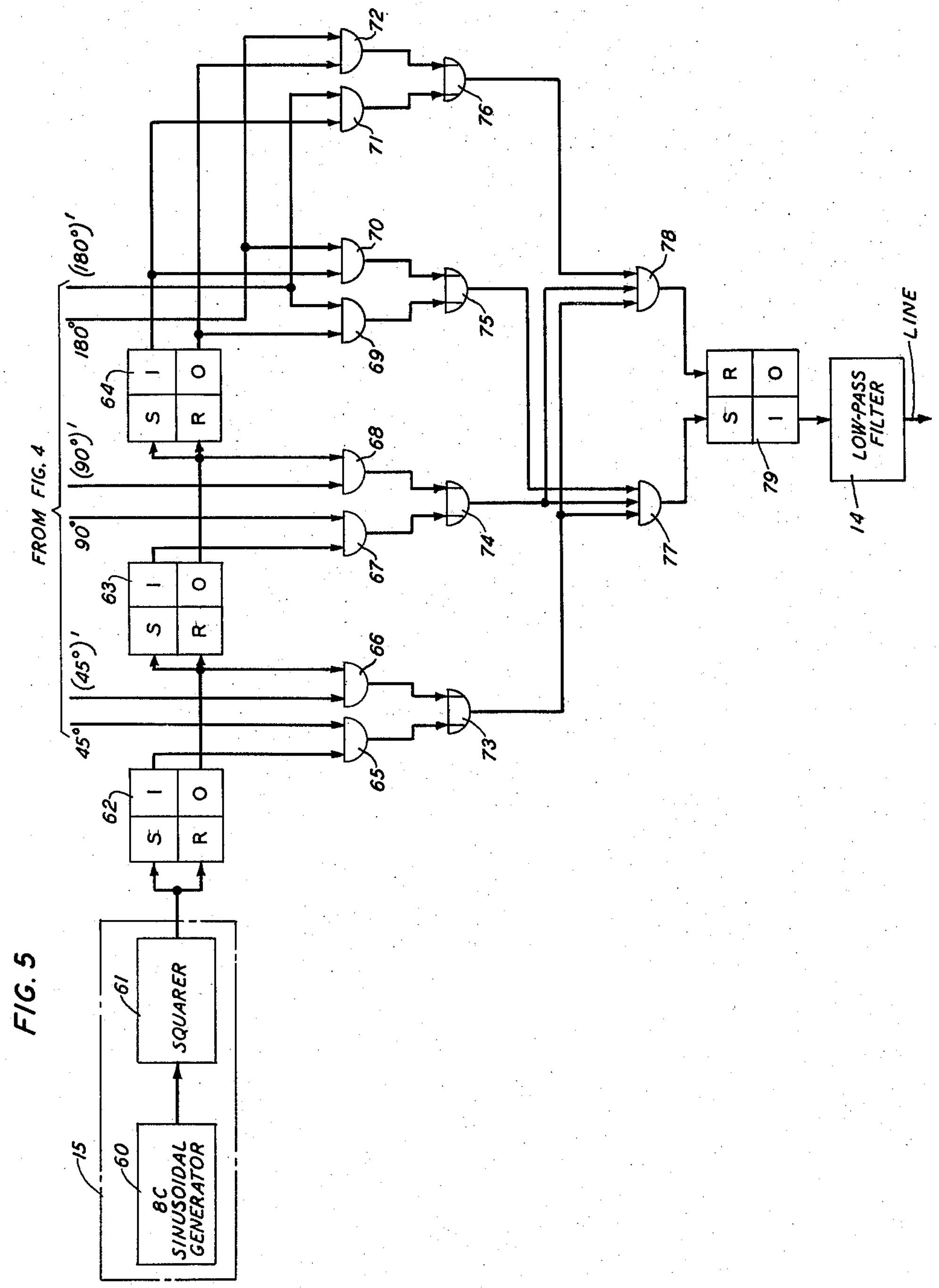
FIG. 5 is a detailed block diagram of a digital carrier-wave generator according to this invention.
Figure 6:
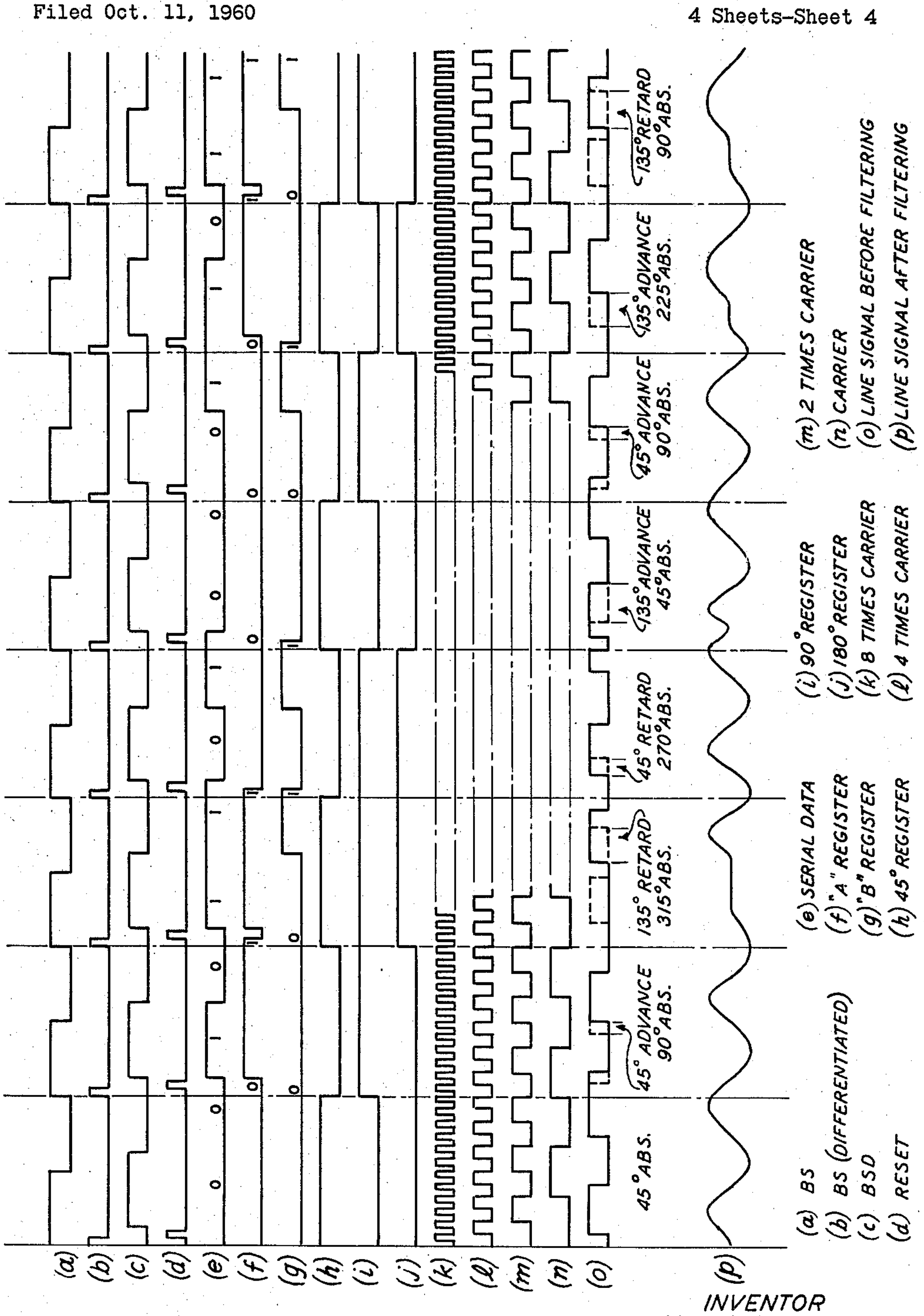
FIG. 6 is a pulse diagram useful in explaining the operation of the embodiments of this invention.

FIGS. 3, 4 and 5 taken together fill out the details of the all-digital system according to FIG. 1. FIG. 6 is a pulse diagram showing the waveforms occurring at different points in the circuits of these figures for a typical random data message.

FIG. 3 is a diagrammatic of a practical serial-to-parallel converter for performing the function of block 11 of FIG. 1. Two flip-flop registers 32 and 33 store successive serial pulses under control of clock generator 16. Registers 32 and 33 are represented as having two inputs designated set "S" and reset "R," and two outputs designated 1 and 0. These registers are conventional bistable circuits employing electron tubes or transistors and function in a well-known manner. The outputs of the two registers are also designated A, A′, B and B′. There is an output on A or B when the "1" output is grounded. At this time the primed outputs are at a negative polarity. Conversely, when the "0" outputs are at ground there is a useful output on A′ and B′ and negative voltage on A and B.

Clock generator 16 produces a square wave output at the dibit rate or 1000 cycles per second. This is diagrammed on line (*a*) of FIG. 6 and is labeled BS. The other output (BS)′ is the inverse or complement of this square wave. The outputs BS and (BS)′ are delayed in network 17 to produce square wave BSD (shown on line (*c*) of FIG. 6) and its complement (BSD)′. The BSD and (BSD)′ square waves alternately enable and disable coincidence gates 30 and 31 indicated conventionally by half circles. The output of serial data source 10 is applied to gates 30 and 31 in parallel. The outputs of the gates connect to the set inputs of the respective registers 32 and 33.

A typical data message is shown on line (*e*) of FIG. 6 as the sequence 0010110100011011. Lines (*f*) and (*g*) of FIG. 6 show the resulting condition of the registers 32 and 33 for this sequence of data. Just prior to the start of a new BSD square wave a reset pulse (shown in line (*d*) of FIG. 6) is delivered to the R inputs of registers 32 and 33, as shown, to restore them to their normal condition—ground on the primed outputs. Registers 32 and 23 are filled and emptied in an obvious manner.

FIG. 4 shows the vector keyer 12 of FIG. 1 as comprising three flip-flop or memory circuits 41, 46 and 53 connected in tandem through appropriate coincidence (commonly called AND) and isolating (commonly called OR) gates. The left-hand flip-flop 41 is driven by the BS square wave from FIG. 3 through a differentiating capacitor 40. This wave is shown on line (*b*) of FIG. 6. The S and R inputs of flip-flop 41 are connected in parallel so that it is alternately set and reset by the BS pulse for a countdown of two. The output of flip-flop 41 appears as the 45-degree output and its complement of the vector keyer and is unaffected by the condition of the registers A and B in FIG. 3. Line (*h*) of FIG. 6 shows this output.

The outputs of flip-flop 41 are connected to the inputs of flip-flop 46 through coincidence gates 42 or 43, isolating gate 44 and coincidence gate 45. Gates 42 and 43 are enabled in the alternative by the condition of the B register of FIG. 3. Flip-flop 46 is, therefore, set or reset under the control of the B register. Its outputs are designated 90-degree. With no signal in the B register, flip-flop 46 merely counts in the manner of a binary adder from the BS input by four in normal ascending numerical order: i.e., 0, 1, 2, 3, 4. However, with a 1 signal in the B register, flip-flop 46 is controlled by the complementary output of flip-flop 41 in the manner of a binary subtractor in descending numerical order: i.e., 4, 3, 2, 1, 0. The output of flip-flop 46 appears as in line (*i*) of FIG. 6 for the representative B register conditions shown on line (*g*) of FIG. 6.

Flip-flop 53 is identical to flip-flops 41 and 46, except that it is driven by the output of either flip-flop 46 or 41 depending on the condition of the A and B signal registers. Coincidence gates 49 and 50 are enabled or not in accordance with the condition of the A register. Since the inputs to flip-flops 46 and 53 are controlled through coincidence gates 45 and 52 which are enabled by the BS pulse on line 54, the flip-flops operate not on the transitions in the preceding flip-flops but on the condition thereof just prior to the occurrence of the BS pulse. It is assumed that there is an inherent delay in the change of state in each flip-flop after the application of the driving pulses. To avoid untimely reoperations of the flip-flop 53 when the preceding flip-flop 46 does not change its state on the occurrence of a given BS pulse, the condition of the output of isolating gate 44 is connected by lead 55 to coincidence gates 49 and 50 in the output of flip-flop 46.

The whole of the vector keyer 12 is intended to add or subtract 45 or 135 degrees from the carrier phase in accordance with the signal coding. The 00 code adds 45 degrees to the previous carrier phase, and the code 11 subtracts 45 degrees therefrom. Similarly, the code 01 adds 135 degrees to the previous phase and the code 10 subtracts 135 degrees. Truth or logic tables of binary codes may be made up to illustrate the operation of the keyer circuit. Direct outputs are designated "1" and absence of an output by "0." A change of 1 in the least significant digit is equivalent to a phase shift of 45 degrees. Similarly changes of 1 in the next higher digits are equivalent to phase shifts of 90 and 180 degrees, respectively.

*Table I*

| Code | | | | | | | | | | | |
|---|---|---|---|---|---|---|---|---|---|---|---|
| 00 | | | 01 | | | 10 | | | 11 | | |
| Add 45° | | | Add 135° | | | Subtract 135° | | | Subtract 45° | | |
| 180° | 90° | 45° | 180° | 90° | 45° | 180° | 90° | 45° | 180° | 90° | 45° |
| 0 | 0 | 0 | 0 | 0 | 0 | 0 | 0 | 0 | 0 | 0 | 0 |
| 0 | 0 | 1 | 0 | 1 | 1 | 1 | 0 | 1 | 1 | 1 | 1 |
| 0 | 1 | 0 | 1 | 1 | 0 | 0 | 1 | 0 | 1 | 1 | 0 |
| 0 | 1 | 1 | 0 | 0 | 1 | 1 | 1 | 1 | 1 | 0 | 1 |
| 1 | 0 | 0 | 1 | 0 | 0 | 1 | 0 | 0 | 1 | 0 | 0 |
| 1 | 0 | 1 | 1 | 1 | 1 | 0 | 0 | 1 | 0 | 1 | 1 |
| 1 | 1 | 0 | 0 | 1 | 0 | 1 | 1 | 0 | 0 | 1 | 0 |
| 1 | 1 | 1 | 1 | 0 | 1 | 0 | 1 | 1 | 0 | 0 | 1 |

The operation of the vector keyer of FIG. 4 can be shown to be that of a three-digit binary computer with the aid of Table I and FIG. 6. Assume that the flip-flops 41, 46 and 53 are in the states indicated in the first dibit interval of FIG. 6 with the 00 code standing in the signal registers, namely: 001. The 00 code from Table I requires a phase shift of 45 degrees, i.e., addition of one, to the condition 010. Upon the occurrence of the BS pulse the flip-flop 41 prepares to change its state to 0 regardless of the code. B' is 0 with the result that coincidence gate 42 is enabled. Since flip-flop 41 at this instant registers a 1, the output of gate 42 is passed through isolating gate 44 and coincidence gate 45, which is simultaneously enabled by the BS pulse, to cause flip-flop 46 to prepare to change state to 1. The 1 in the output of gate 44 over lead 55 partially enables gates 49 and 50. The 1 standing on lead A' fully enables gate 49. However, flip-flop 46 had no output and no change order is sent to flip-flop 53. The final state of the flip-flop is therefore 010, representing a total phase shift of 90—45=45 degrees advance.

The change in flip-flop states from 111 in the fourth dibit interval in FIG. 6 for the code signal combination 11 to 110, i.e., subtraction of one, can be traced in a similar fashion using the last three columns of Table I and remembering that gates 43 and 50 are enabled by the A and B outputs of the signal registers rather than gates 42 and 49.

For the unlike codes 01 and 10 which require 135-degree phase shifts equivalent to the addition or subtraction of a binary 3, the loop feeding the output of flip-flop 41 directly to flip-flop 53 comes into use. Consider the change in the third dibit interval in FIG. 6 for the code 10. The flip-flops ended the previous interval in the 010 state as previously developed. Table I requires a change to the condition 111. The BS pulse at the beginning of the third interval changes the state of flip-flop 41 as before. The signal on the B' lead enables gate 42. Since, however, flip-flop 41 had no 1 output just prior to the occurrence of the BS pulse, no change occurs in flip-flop 46. Further, it is seen that no enabling output on lead 55 is communicated to gates 49 and 50 at the output of flip-flop 46, and no change order is delivered to flip-flop 53 from flip-flop 46. The AB' (10) code has, however, enabled gate 47, which is also connected to the 0 output of flip-flop 41, then activated. Therefore, a 1 is delivered through coincidence gate 47, isolating gate 51 and coincidence gate 52 to flip-flop 53 which changes its state. The final condition is 111 as required by Table I, an advance of 180+45=225 degrees equivalent to a retardation in phase of 135 degrees.

The operation of the vector keyer of FIG. 4 for the signal code 01 is similar to that for signal code 10 except that coincidence gate 48 is enabled instead of gate 47. For the circuit conditions of the fifth dibit interval, however, it may be noted that although gate 48 is enabled by the signal register there is no output on the 45-degree lead of flip-flop 41. Flip-flop 53 nevertheless is caused to change its state by way of gate 49 which is enabled on signal lead A', lead 55 and the 90-degree output of flip-flop 46. The condition of the flip-flops, therefore, changes from 110 to 001 as required by Table I.

FIG. 5 illustrates a modulator for digital phase-shifted carrier generation. The square-wave generator 15 comprises a sinusoidal generator 60 which operates at eight times the carrier frequency of 1500 cycles per second or 12 kilocycles per second. It may be crystal-controlled, if desired. The output of sinusoidal oscillator 60 is passed through a squarer 61, which changes the sine-wave output of oscillator 60 into a rectangular wave at the same frequency. The modulator proper comprises a three-stage binary counter 62, 63 and 64, a first group of coincidence gates 65 through 72, a group of isolating gates 73 through 76, a second group of coincidence gates 77 and 78, an output flip-flop 79 and a low-pass filter 14. The binary counters 62, 63 and 64 operate as count-down or frequency-dividing circuits and have respectively outputs of four times, two times and one times the carrier frequency. The counters are conventional flip-flop circuits, each succeeding one being driven by the 0 output of the preceding. The outputs of the counters are used to operate the output flip-flop circuit 79 through the several gates under the control of the outputs from the vector keyer of FIG. 4. The outputs of the generator 15 and counters 62, 63 and 64 are shown in FIG. 6 on lines (*k*), (*l*), (*m*) and (*n*), respectively.

To illustrate the operation of the modulator of FIG. 5 assume that the outputs from the vector keyer are as shown in the first dibit interval of FIG. 6, namely: 45°, (90°)′ and (180°)′. Under these conditions gates 65, 68, 69 and 71 are enabled. It is seen that gates 77 and 78 are then alternately enabled at carrier rate as the output of counter 64 alternates between 1 and 0. Gate 77 therefore operates through isolating gate 73 to set flip-flop 79 whenever counters 62, 63 and 64 have simultaneous 1, 0 and 0 outputs, respectively. Similarly, flip-flop 79 is reset through gate 78 whenever the counters have respectively 1, 0 and 1 outputs. Thus, flip-flop 79 produces a rectangular wave output at carrier rate determined by counter 64 with phase synchronized with the outputs of counters 62 and 63. The gating operations for other vector keyer output combinations can be traced in a similar fashion. The vector keyer of FIG. 4 is seen to serve as a memory of the phase being transmitted.

Line (*o*) of FIG. 6 shows the resultant phase-shifted rectangular waves for the message previously assumed. The phase shifts in each dibit interval with respect to the previous dibit interval are marked on FIG. 6. The absolute phase is also shown for comparison. The dotted square waves are continuations of those in the previous interval for the purpose of showing the phase shift graphically. The absolute phases show that the phase changes between signals shift from one quadrature set of phases which are odd multiples of 45 degrees to another set of phases which are even multiples of 45 degrees as previously mentioned.

It is apparent from the above description that only the square waves four, two and one times the carrier frequency are needed in the modulator of FIG. 5. A master oscillator at eight times the carrier frequency is shown however, for a practical reason. When converting a sine-wave into a square wave, it is not often practically feasible to slice the sine-wave at precisely the zero level. Rather slicing occurs above or below the zero level. This tends to make the resultant rectangular wave unsymmetrical in its positive and negative half-cycles. But for the purpose of defining accurate 45-degree intervals in the carrier wave, a symmetrical square wave at four times the carrier frequency is essential. Every other transition in the eight times carrier frequency wave occurs at the proper instant and only these transitions are used to control the frequency division to the four times carrier frequency square wave. If an ideal square wave at four times the carrier frequency is available, no higher harmonic is needed.

Line (*p*) of FIG. 6 shows the appearance of the line signal obtained by passing the square wave signal of line (*o*) through a low-pass filter 14 indicated in FIG. 5. In a receiver for such a signal a detector for comparing the full one-and-a-half cycles of successive dibit intervals is required.

The output of the specific vector keyer of FIG. 5 can also be used to control a sinusoidal wave as indicated in FIG. 2 in the manner already indicated.

While this invention has been described by means of specific embodiments, it is not intended to be limited to these examples. Equivalent embodiments may be conceived by those skilled in the art. The counters and flip-flops may comprise electron tubes of transistors. Diodes or transistors may be used in the gate circuits. Other ratios between message and carrier rates may also be employed. This invention has application to a phase-modulation transmission system such as is disclosed in the application of P. A. Baker, Serial No. 49,544, filed August 15, 1960. Numerous other arrangements may be devised by those skilled in the art without departing from the spirit and scope of the invention.

What is claimed is:

1. A transmitter for a communication system in which pairs of successive binary signals are carried on a wave of a single frequency and in which the phase of said wave may be any one of eight relative phases comprising a master electric wave source operating at eight times said single frequency, a source of timing pulses synchronized with said master source and representing a transmission rate for said pairs of binary signals lower than said single frequency, frequency dividing means driven by said master source for deriving said single frequency and multiples thereof, a source of data signals occurring at twice said transmission rate, means for translating serial data signals from said data source to parallel form in pairs, a transmission line, and logic circuitry for keying said frequency dividing means to said transmission line at intervals phase-shifted in response to said timing pulses and to said translated data signals by a multiple of 45 degrees in accordance with the relationship between successive pairs of data signals whereby a predetermined shift in the phase of said single frequency occurs for every successive pair of data signals.

2. A transmitter for a communication system in which pairs of successive binary digital signals are encoded on a phase-shifted carrier wave of a single frequency as one of eight preselected relative phases comprising a serial data source, means for converting the output of said data source into two-bit parallel form, a clock generator for synchronizing the operations of said transmitter and for determining the interval of time during which each successive digit pair is transmitted, decisional logic means under the control of said clock generator for sampling the output of said converter and for computing the amount of phase shift necessary to transmit each particular digit pair according to a predetermined code, a master oscillator for generating a wave in fixed relation with the frequency of said carrier wave, modulator means responsive to the output of said logic means for imparting to the output of said master oscillator the phase shift determined by said logic means.

3. A transmitter according to claim 2 in which the output of said master oscillator is a square wave at least four times the frequency of said carrier wave, said logic means is a three-stage binary counter, and said modulator is a three-stage frequency divider.

4. A transmitter according to claim 2 in which the output of said master oscillator is a sine-wave at said carrier frequency, and said modulator comprises a first switching device for reversing the phase of the direct output of the master oscillator under the control of one output of said logic means, a quadrature phase-shifter for the output of the master oscillator, a second switching device for reversing the phase of the output of said phase-shifter under the control of a second output of said logic means, a mixer circuit for combining the output of said first and second switching devices, and a 45-degree phase-shifter coupled to the output of said mixer circuit and inserted or not under the control of a third output of said logic means.

5. In a phase-modulated carrier transmission system in which said carrier may be any one of eight preselected relative phases, a transmitter comprising a source of serial binary data message signals, means for translating said serial data signals into different ones of four dibit pair combinations at a synchronous rate, a clock source for controlling said synchronous rate, a stable frequency source having a frequency at least four times that of said carrier wave, means for converting the output of said frequency source into square waves, means for frequency dividing the output of said converting means into square waves of two and one times said carrier frequency, keying means for said frequency-dividing means responsive to each incident dibit pair combination for generating control signals representative of 45-, 90- and 180-degree phase shift subcombinations according to a predetermined code at said synchronous rate, a modulator under the control of said keying means comprising a plurality of tandem bistable circuits having a single input point and complementary output points, an output bistable flip-flop circuit, a plurality of coincidence gates enabled by said control signals for directing the outputs of said modulator to the input of said output bistable circuit in a sequence to form said phase-shifted carrier wave.

6. A phase-pulse generator for modulating a single frequency with simultaneous information from a pair of binary data channels comprising two sources of binary data, a source of timing pulses for synchronizing said data sources, a source of rectangular waves at eight times said single frequency, means for encoding the simultaneous outputs of said data sources as predetermined incremental phase shifts of a multiple of 45 electrical degrees in three-digit binary forms, means for frequency dividing the output of said rectangular wave source into further rectangular waves four, two and one times said single frequency, an output bistable circuit, gating means for setting and resetting said bistable circuit in sequence at said single frequency from the outputs of said frequency dividing means under the control of the outputs of said encoding means.

7. A phase-shift generator for modulating a single carrier frequency wave with paired serial binary data as relative phase shifts of an integral multiple of 45 electrical degrees comprising a serial data source, means for pairing data bits emitted from said data source, a source of timing pulses occurring at half the serial data rate, a stable source of electrical oscillations, means under the control of said timing source for computing from the paired combinations standing in said pairing means in each timing interval the corresponding amount of phase shift as a three-digit binary number according to a predetermined code, said three-digit number representing phase shifts of 45, 90 and 180 electrical degrees in order of increasing digit significance, an output circuit, and means for modulating the output of said computing means with the output of said source of oscillations to form in said output circuit a coded sequential phase-shifted wave of said single frequency.

8. The generator according to claim 7 in which said stable source of oscillations produces a rectangular wave at eight times said single frequency, said computing means comprises three bistable circuits each having two stages, a common input point and complementary output points, the first of said circuits being complemented by each timing pulse, a first pair of coincidence gates coupled to the respective outputs of said first bistable circuit and enabled in the alternative according as the second signal element of a data bit pair is present or absent, a first isolating gate interconnecting the outputs of said first coincidence gates and the input point of the second bistable circuit whereby the output of the latter is complemented or not by the concurrence or not of inputs to either of said first coincidence gates, a second pair of coincidence gates coupled to the respective outputs of said second bistable circuit and enabled in the alternative according as the first signal element of a data bit pair is present or absent, a third pair of coincidence gates coupled to the respective outputs of said first bistable circuit and enabled in the alternative according to the order in which the first and second signal elements are simultaneously unlike and an output appears concurrently on the corresponding output of said first bistable circuit, a second isolating gate interconnecting the output of said second and third pairs of coincidence gates to the input point of the third bistable circuit whereby said third bistable circuit is complemented by the outputs of said first and second bistable circuits for certain signal combinations, and further coincidence gates respectively controlling the connections of said first and second isolating gates to the input points of said second and third bistable gates only when said clock pulse occurs, and said modulator means comprises three bistable circuits each having an input point and complementary output points, one of the output points on each of the first and second bistable circuits being connected to the input points of the second and third bistable circuits respectively, a first pair of coincidence gates connected to the complementary outputs of said first bistable circuit and enabled in the alternative by the complementary outputs of the first bistable circuit of said computing means, a second pair of coincidence gates connected to the complementary outputs of said second bistable circuit and enabled in the alternative by the complementary outputs of the second bistable circuit of said computing means, a group of four coincidence gates connected in pairs to the complementary outputs of said third bistable circuit and one in each of said pairs enabled in the alternative by the complementary outputs of the third bistable circuit of said computing means, a group of four isolating gates for combining the outputs of said first pair, said second pair, and the separate pairs of said group of four coincidence gates respectively, an output bistable circuit having set and reset input points and an output point, a pair of three-input coincidence gates having output points connected respectively to the set and reset input points of said output bistable circuit and enabled simultaneously by the outputs of the first and second of said last-mentioned isolating gates and alternatively by the outputs of the third and fourth of said last-mentioned isolating gates.

9. A transmitter for encoding serial binary data taken two at a time into relative phase shifts of a single carrier frequency comprising a source of serial data, means for converting the output of said data source into dibit combinations at a synchronous rate, there being four such dibit combinations, a clock source for determining said synchronous rate, means under the joint control of said clock source and said converting means for computing according to a preselected code successive phase shifts to be imparted to said single frequency for each successive dibit combination in the form of a three-digit binary number corresponding respectively to phase shifts of 45, 90 and 180 degrees in increasing order of digit significance, a master source of stable oscillations, means for frequency dividing the output of said master source into rectangular waves four, two and one times said single frequency, a bistable output circuit having set and reset input points, and means responsive to the 45-, 90- and 180-degree digits of said computing means for sequentially gating the four, two and one times outputs, respectively, of said frequency dividing means to the input points of said output circuit to form said phase-shifted single-frequency output signal.

10. A transmitter for encoding serial binary data taken two at a time into relative phase shifts of a single frequency carrier wave comprising a source of serial data, means for converting the output of said data source into dibit combinations at a synchronous rate, a clock source gated to said converting means for determining said synchronous rate, means for computing according to a preselected code successive phase shifts to be imparted to said single frequency carrier wave for each successive dibit combination in the form of a three digit binary number corresponding respectively to phase shifts of 45, 90 and 180 degrees in increasing order of digit significance, the outputs of said computing means being on-off signals corresponding to the presence or absence of each of said 45-, 90- and 180-degree phase shifts, a stable source of said single frequency, a first modulator connected directly to the output of said stable source controlled by the 180-degree output of said computing means for reversing the phase of the output of said stable source or not according to the presence or absence of said 180-degree output, a quadrature phase-shifter connected to the output of said stable source, a second modulator connected to the output of said phase-shifter controlled by the 90-degree output of said computing means for reversing the output of said phase-shifter or not according to the presence or absence of said 90-degree output, a summing circuit for combining the outputs of said first and second modulators to form an output at said single frequency in one or four quadrature phases, a 45-degree phase-shifter, and means for switching said 45-degree phase-shifter in series with the output of said summing circuit or not according to the presence or absence of said 45-degree output to form a line signal at said single frequency sequentially occurring in one of eight phases which are integral multiples of 45 degrees.

References Cited in the file of this patent

UNITED STATES PATENTS

| | | |
|---|---|---|
| 2,220,201 | Bliss | Nov. 5, 1940 |
| 2,710,396 | Harris | June 7, 1955 |